(12) United States Patent
Ohtsuka

(10) Patent No.: US 6,807,670 B2
(45) Date of Patent: Oct. 19, 2004

(54) OBJECTIVE LENS DRIVING MECHANISM IN OPTICAL STORAGE DEVICE

(75) Inventor: Shinichi Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 09/767,159

(22) Filed: Jan. 22, 2001

(65) Prior Publication Data

US 2001/0048657 A1 Dec. 6, 2001

(30) Foreign Application Priority Data

May 31, 2000 (JP) ........................................ 2000-161844

(51) Int. Cl.⁷ .............................................. G11B 7/08
(52) U.S. Cl. ...................................................... 720/672
(58) Field of Search ................................ 369/244, 249, 369/112.01, 220, 248; 360/266.2, 266.4, 266.9; 359/824

(56) References Cited

U.S. PATENT DOCUMENTS

| | | | |
|---|---|---|---|
| 5,663,843 A | | 9/1997 | Ezawa et al. ............... 359/824 |
| 5,761,183 A | * | 6/1998 | Ikegame .................... 369/220 |
| 5,870,373 A | * | 2/1999 | Choi et al. ................. 369/244 |
| 6,031,812 A | * | 2/2000 | Liou ......................... 369/244 |
| 6,069,867 A | * | 5/2000 | Ikegame .................... 369/248 |
| 6,175,546 B1 | * | 1/2001 | Liou ......................... 369/244 |
| 6,314,076 B1 | * | 11/2001 | Arai et al. .................. 369/244 |
| 6,392,847 B1 | * | 5/2002 | Kabasawa et al. ........ 360/266.9 |
| 6,445,674 B1 | * | 9/2002 | Morita ....................... 369/244 |
| 6,473,384 B1 | * | 10/2002 | Oumi et al. ........... 369/112.01 |
| 6,473,389 B2 | * | 10/2002 | Hirai et al. ................. 369/244 |
| 6,504,813 B2 | * | 1/2003 | Suzuki et al. .............. 369/244 |

FOREIGN PATENT DOCUMENTS

| | | |
|---|---|---|
| JP | 1-312742 | 12/1989 |
| JP | 05189786 | 7/1993 |
| JP | 07029194 | 1/1995 |
| JP | 08273177 | 10/1996 |
| JP | 09022536 | 1/1997 |

* cited by examiner

Primary Examiner—Tianjie Chen
(74) Attorney, Agent, or Firm—Greer, Burns & Crain, Ltd.

(57) ABSTRACT

An optical storage device including a carriage mounted on a base so as to be reciprocatable in a given direction; a driving mechanism for moving the carriage, the driving mechanism including a first coil fixed to the carriage and a first magnetic circuit mounted on the base; an objective lens for focusing a light beam output from a light source onto an optical storage medium; and a lens holder for holding the objective lens. The optical storage device further includes a conductive elastic support member for movably supporting the lens holder relative to the carriage, the conductive elastic support member having a first end fixed to the carriage and a second end fixed to the lens holder; and a flexible printed circuit board electrically connected to the conductive elastic support member and having one end fixed to the carriage. A second coil is fixed to the lens holder, and is electrically connected to the conductive elastic support member. A second magnetic circuit is fixed to the carriage so as to face the second coil.

18 Claims, 12 Drawing Sheets

OBJECTIVE LENS DRIVING MECHANISM IN OPTICAL STORAGE DEVICE

BACKGROUND OF THE INVENTION

1. Field of the Invention

The present invention relates generally to an optical storage device, and more particularly to an objective lens driving mechanism in an optical storage device.

2. Description of the Related Art

An optical disk has received attention as a memory medium that becomes a core in the recent rapid development of multimedia, and it is usually accommodated in a cartridge case for practical use. The optical disk is loaded into an optical disk drive to perform reading/writing of data from/to the optical disk by means of an optical pickup (optical head).

A recent optical pickup of an optical disk drive intended to realize size reduction is composed of a fixed optical assembly including a laser diode, a beam splitter for reflecting and transmitting a laser beam, and a photodetector for receiving reflected light from an optical disk, and a movable optical assembly including a carriage, an objective lens mounted on the carriage, and a focusing mechanism having a support member for the objective lens and a focusing coil.

The objective lens is supported by a lens holder. The lens holder is supported to the carriage by two metallic parallel leaf springs in a cantilever fashion. A pair of focusing coils are fixed to the lens holder, and a pair of focusing magnetic circuits are mounted on the carriage so as to respectively face the pair of focusing coils fixed to the lens holder. Each focusing magnetic circuit supplies a magnetic flux to the corresponding focusing coil carrying a current to thereby apply an electromagnetic force to the lens holder along the optical axis of the objective lens, thus driving the objective lens along its optical axis.

The carriage is movable in the radial direction of the optical disk as being guided by a pair of guide rails by a carriage driving mechanism. The carriage driving mechanism includes a pair of carriage driving coils fixed to the opposite side surfaces of the carriage and a pair of carriage driving magnetic circuits mounted on a base along the opposite side surfaces of the carriage. Each carriage driving coil is partially inserted in a gap defined in the corresponding carriage driving magnetic circuit. When the carriage driving coils are energized, an electromagnetic force is applied to the carriage to thereby drive the carriage in the radial direction of the optical disk.

With this arrangement, the focusing mechanism performs focusing control of the focal position of the objective lens so that the focal point of the objective lens always lies on a fluctuating recording surface of the optical disk. Further, the carriage is driven by the carriage driving mechanism to move the objective lens in the radial direction of the optical disk to an arbitrary track on the optical disk (seek control). Further, the carriage driving mechanism performs tracking control such that the focal position of the objective lens always follows a desired track whose position is fluctuated in the radial direction of the optical disk by the vibrations of a spindle motor or by off-centering upon chucking the optical disk.

A write-power laser beam emitted from the laser diode of the fixed optical assembly is first collimated by a collimator lens, next transmitted by the beam splitter, next reflected by a beam raising mirror, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the beam splitter, and finally detected by the photodetector, thereby converting the detected optical signal into an electrical signal.

In such a conventional objective lens driving mechanism, a flexible printed circuit board (FPC sheet) is longitudinally placed on the leaf springs supporting the lens holder in a cantilever fashion, so as to feed a current to the focusing coils fixed to the lens holder (Japanese Patent Laid-open No. Hei 6-176384). This conventional current feed structure for the focusing coils has a problem such that its assembling work is troublesome. Further, the thickness of each leaf spring formed of stainless steel is about 20 $\mu$m, whereas the thickness of the FPC sheet is about 40 to 60 $\mu$m and it has rigidity to some extent. Accordingly, there is a problem that variations tend to occur in frequency characteristics, mechanism characteristics such as drive sensitivity, and lens tilt characteristics of the objective lens driving mechanism, depending on a formed condition of the FPC sheet.

SUMMARY OF THE INVENTION

It is therefore an object of the present invention to provide an objective lens driving mechanism in an optical storage device which can improve the assembly workability and stabilize the mechanical characteristics.

It is another object of the present invention to provide an optical storage device which can achieve high-precision positioning of the focal point of the objective lens to thereby realize high-density recording and/or reproduction of information.

In accordance with an aspect of the present invention, there is provided an optical driving device including an objective lens for focusing a light beam onto an object; a lens holder having the objective lens; a platelike conductive elastic support member having one end for supporting the lens holder and the other end having a first terminal portion; a fixing member for fixing the other end of the platelike conductive elastic support member; a coil electrically connected to the platelike conductive elastic support member and fixed to the lens holder; and a flexible printed circuit board connected to the first terminal portion of the platelike conductive elastic support member.

The platelike conductive elastic support member further has a second terminal portion connected to the coil. Preferably, the first terminal portion of the platelike conductive elastic support member is provided at a position facing a land of the flexible printed circuit board at right angles to the land.

Preferably, the lens holder has a guide for guiding a lead from the coil toward the second terminal portion of the platelike conductive elastic support member. More preferably, the first terminal portion extends in a longitudinal direction of the platelike conductive elastic support member, and the second terminal portion extends in a transverse direction of the platelike conductive elastic support member. Preferably, the platelike conductive elastic support member includes a pair of first and second conductive leaf springs arranged in parallel.

In accordance with another aspect of the present invention, there is provided an optical storage device capable of at least reading information recorded on an optical storage medium, including a carriage adapted to be reciprocated in a given direction of the optical storage medium; driving means for reciprocating the carriage in the given direction; an objective lens for focusing a light beam output from a light source onto the optical storage medium; a lens holder having the objective lens; a platelike conductive elastic support member having one end for supporting the lens holder and the other end having a first terminal portion; a fixing member mounted on the carriage for fixing the other end of the platelike conductive elastic support member; a coil electrically connected to the platelike conductive elastic support member and fixed to the lens holder; and a flexible printed circuit board connected to the first terminal portion of the platelike conductive elastic support member.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
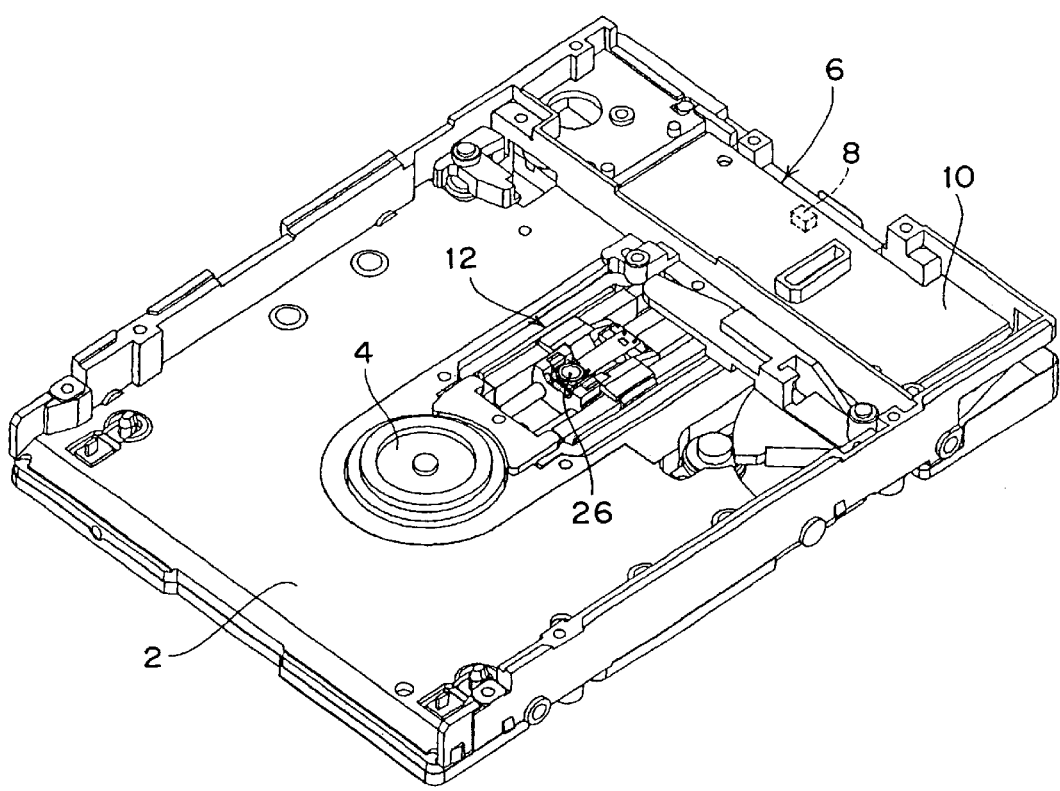
FIG. 1 is a perspective view showing a schematic configuration of an optical disk drive according to a preferred embodiment of the present invention.

Referring to FIG. 1, there is shown a schematic configuration of an optical disk drive according to a preferred embodiment of the present invention. A spindle motor 4 is vertically movably mounted on a base 2 of the optical disk drive. When an optical disk cartridge is inserted into the optical disk drive, the spindle motor 4 is moved upward and an optical disk in the cartridge is chucked to a turntable of the spindle motor 4. Alternatively, the spindle motor 4 may be fixed to the base 2, and the cartridge inserted in the disk drive may be made vertically movable relative to the base 2.

A fixed optical assembly 6 having a laser diode 8 is mounted on the base 2. Although not especially shown, the fixed optical assembly 6 includes a polarization beam splitter, a photodetector for information signal, and a photodetector for servo signal. The base 2 described in this specification includes not only a base as a reference for mounting all the components as shown in FIG. 1, but also a sub-base as a reference for mounting optical components such as a lens carriage and an optical base. Alternatively, an optical base may be mounted on the base 2, and the fixed optical assembly 6 may be mounted on this optical base.

Figure 2:
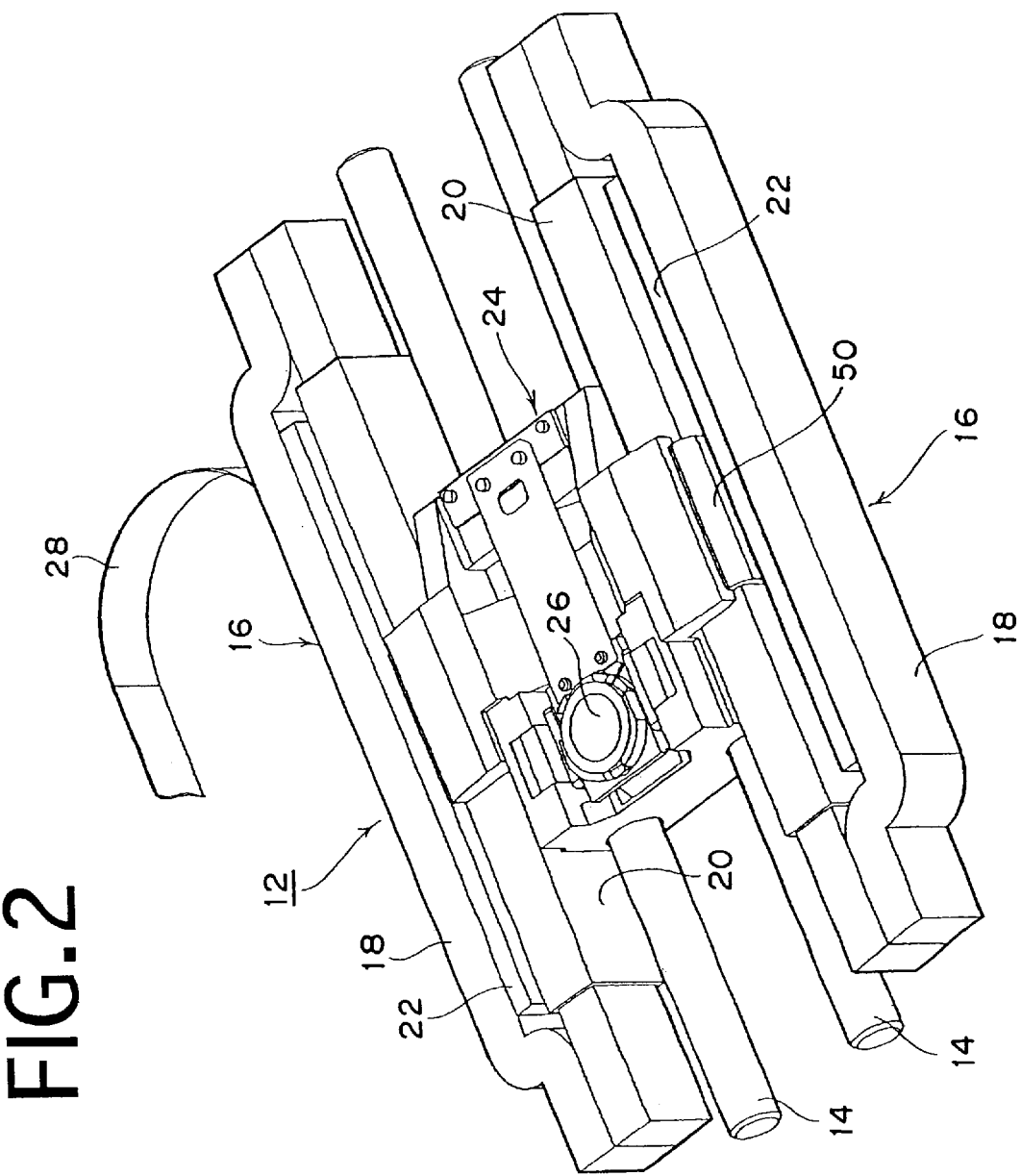
FIG. 2 is a perspective view of a movable optical assembly.

Reference numeral 12 denotes a movable optical assembly for moving an objective lens 26 in the radial direction of the optical disk. The fixed optical assembly 6 and the movable optical assembly 12 constitute an optical pickup. Reference numeral 10 denotes a printed circuit board for the optical pickup. Referring to FIG. 2, there is shown a perspective view of the movable optical assembly 12. The movable optical assembly 12 includes a carriage assembly 24 movable in the radial direction of the optical disk chucked to the spindle motor 4 as being guided by a pair of guide rails 14 fixed to the base 2.

A pair of magnetic circuits 16 are mounted on the base 2 in parallel to the guide rails 14. Each magnetic circuit 16 includes yokes 18 and 20 mounted on the base 2 and a permanent magnet 22 fixed to the yoke 18 by an adhesive or the like. Reference numeral 28 denotes a flexible printed circuit board (FPC sheet) for feeding a current to coils to be hereinafter described.

Figure 3:
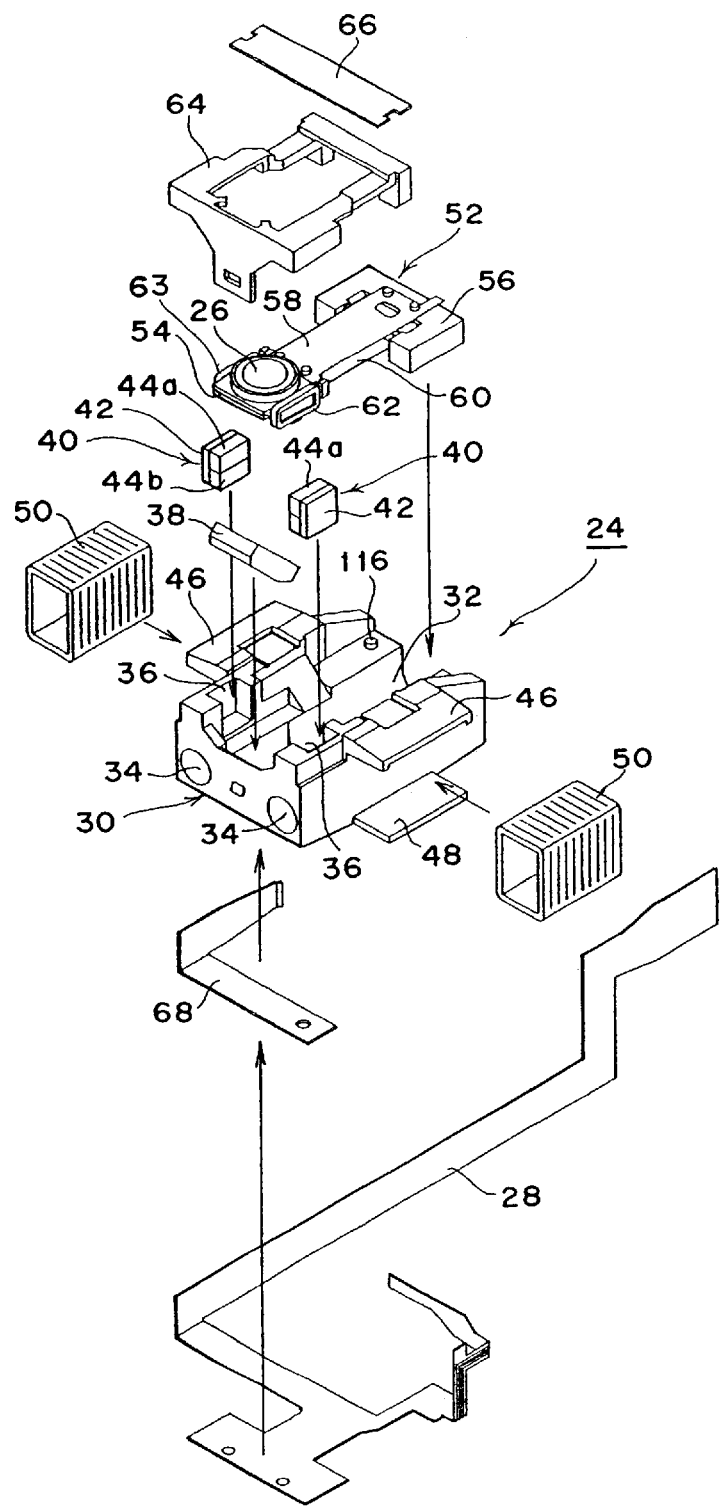
FIG. 3 is an exploded perspective view of a carriage assembly as viewed from its upper side.

Referring to FIG. 3, there is shown an exploded perspective view of the carriage assembly 24. The carriage assembly 24 includes a carriage 30 formed of molded resin. The carriage 30 has a groove 32 as a passage for admitting a laser beam output from the laser diode 8, and a pair of holes 34 through which the pair of guide rails 14 are inserted. The carriage 30 further has a pair of recesses 36 for mounting a pair of focusing magnetic circuits 40.

A beam raising mirror 38 for reflecting the laser beam admitted into the groove 32 of the carriage 30 toward the objective lens 26 is mounted at an end portion of the groove 32. The pair of focusing magnetic circuits 40 are fixed in the pair of recesses 36 of the carriage 30 by an adhesive or the like. Alternatively, the focusing magnetic circuits 40 may be omitted to reduce the number of parts, and the magnetic circuits 16 may be modified so as to serve also as the focusing magnetic circuits 40. In this case, it is necessary to consider the arrangement of the magnets 22 of the magnetic circuits 16. Each side surface of the carriage 30 is integrally formed with a pair of brackets 46 and 48 projecting in parallel, and a carriage driving coil 50 is inserted between the brackets 46 and 48 and fixed thereto by an adhesive or the like. Thus, a pair of carriage driving coils 50 are fixedly mounted on the opposite side surfaces of the carriage 30.

Figure 4:
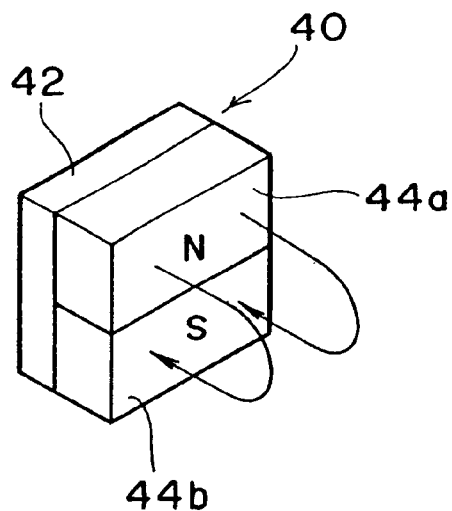
FIG. 4A is a perspective view of a focusing magnetic circuit.
FIG. 4B is a perspective view for illustrating the interaction between the focusing magnetic circuit and a focusing coil.
Figure 4:
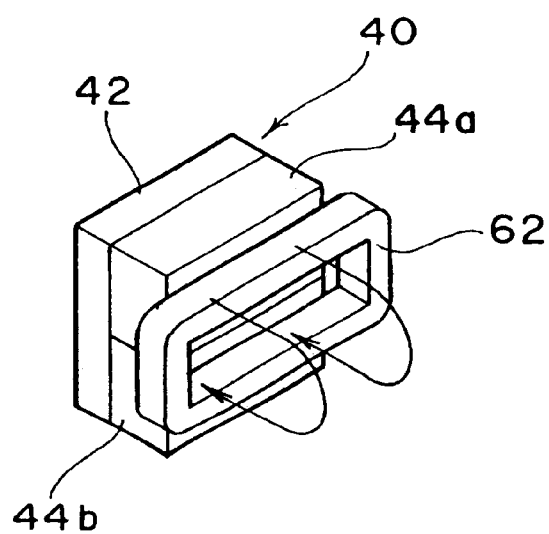

As shown in FIG. 4A, each focusing magnetic circuit 40 includes a yoke 42 and a pair of permanent magnets 44a and 44b fixed to the yoke 42 in such a manner that the magnetic poles on the exposed surfaces of the magnets 44a and 44b are different from each other. As shown in FIG. 4B, magnetic flux lines pass through a focusing coil 62 to be hereinafter described in a direction substantially perpendicular thereto, so that the objective lens 26 fixed to the lens holder 54 is moved along its optical axis by passing a current through the focusing coil 62.

Referring back to FIG. 3, reference numeral 52 denotes an objective lens actuator for driving the objective lens 26 in a focusing direction, i.e., moving the objective lens 26 along its optical axis. As will be hereinafter described in detail, the objective lens actuator 52 includes a lens holder 54 for holding the objective lens 26, a fixing member 56, a pair of parallel leaf springs 58 and 60 each having one end fixed to the fixing member 56 and the other end fixed to the lens holder 54, and a pair of focusing coils 62 and 63 mounted on the opposite side surfaces of the lens holder 54.

Figure 5:
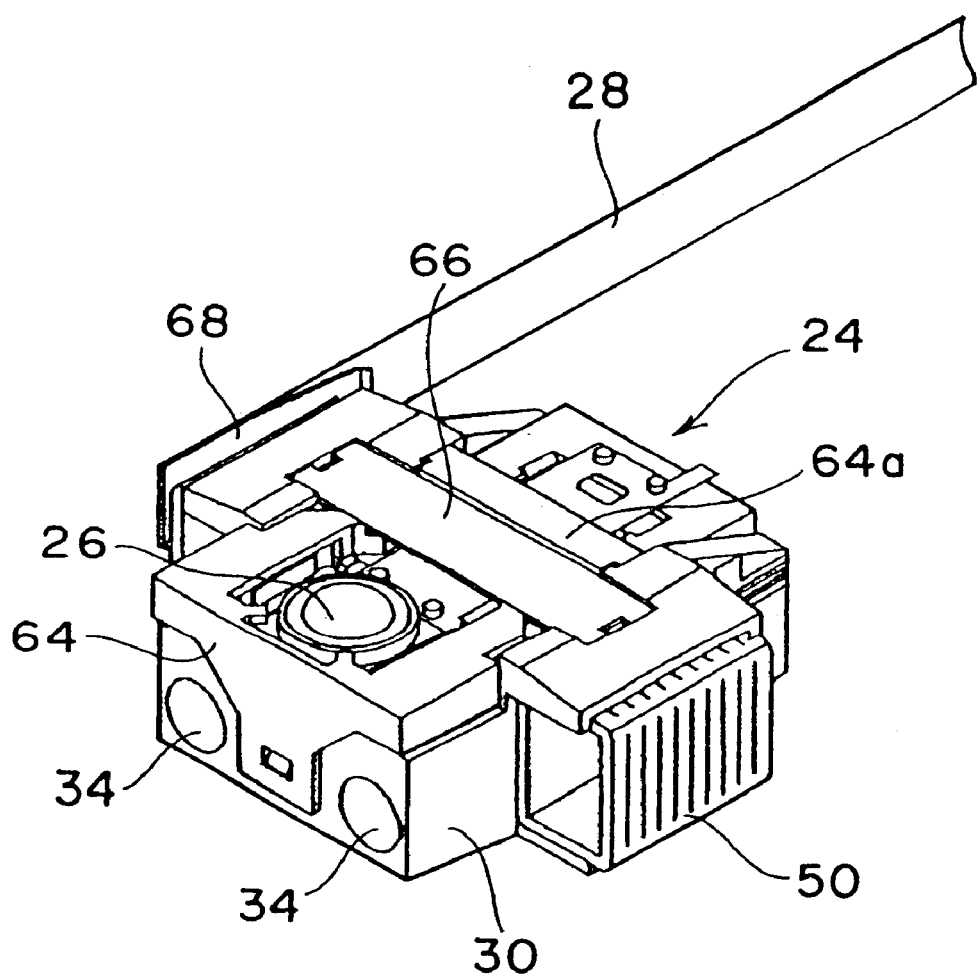
FIG. 5 is a perspective view of the carriage assembly as viewed from its upper side.

The objective lens actuator 52 is mounted on the carriage 30. Referring to FIG. 5, the carriage assembly 24 including the carriage 30 is shown in perspective from its upper side. A molded resin cover 64 is mounted on the carriage 30, and a metallic reinforcing member 66 is fixed to the cover 64. The cover 64 has a restriction member 64a for restricting upward movement of the leaf spring 58 as viewed in FIG. 5.

Figure 6:
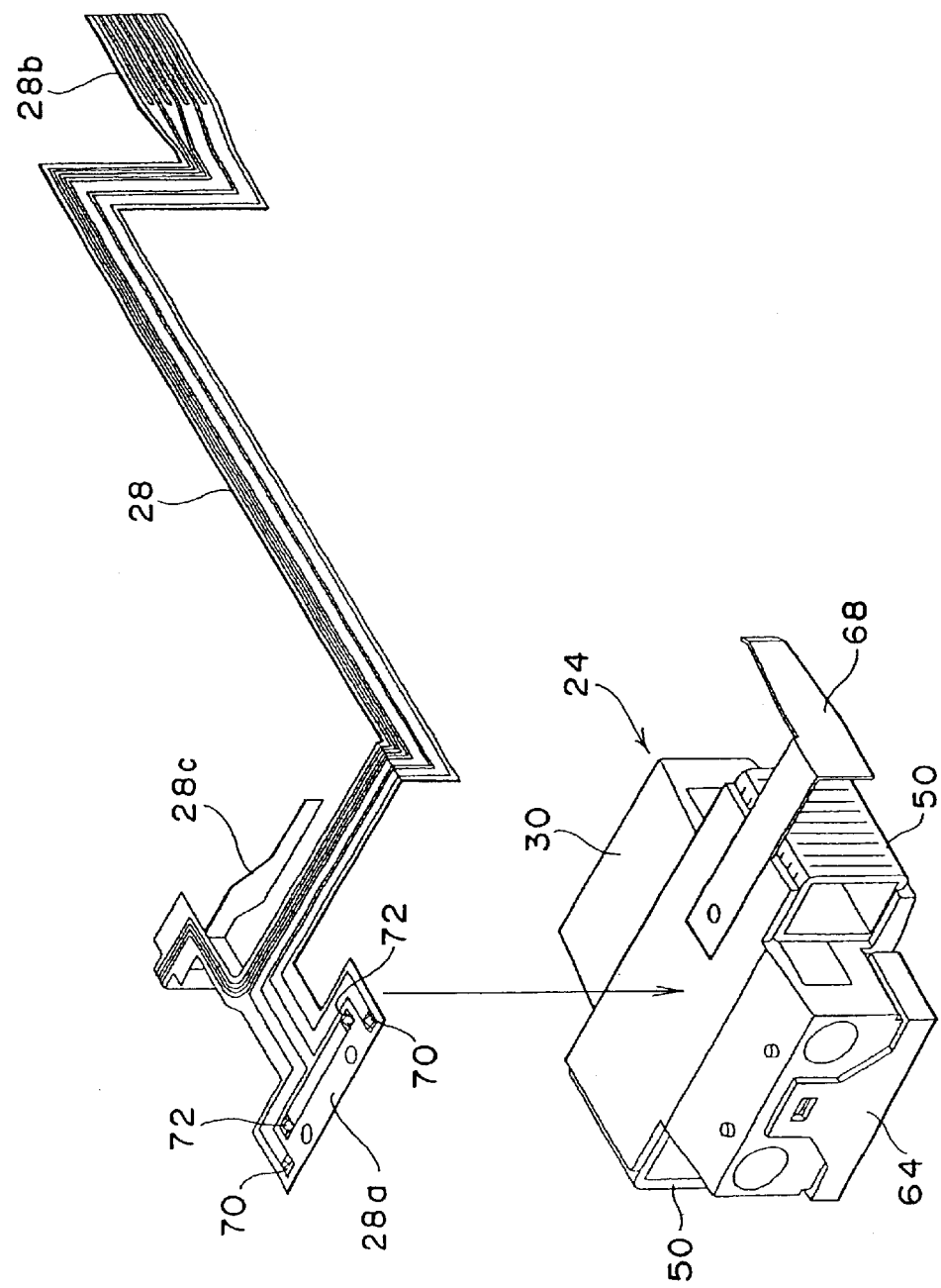
FIG. 6 is an exploded perspective view of the carriage assembly as viewed from its lower side.
Figure 7:
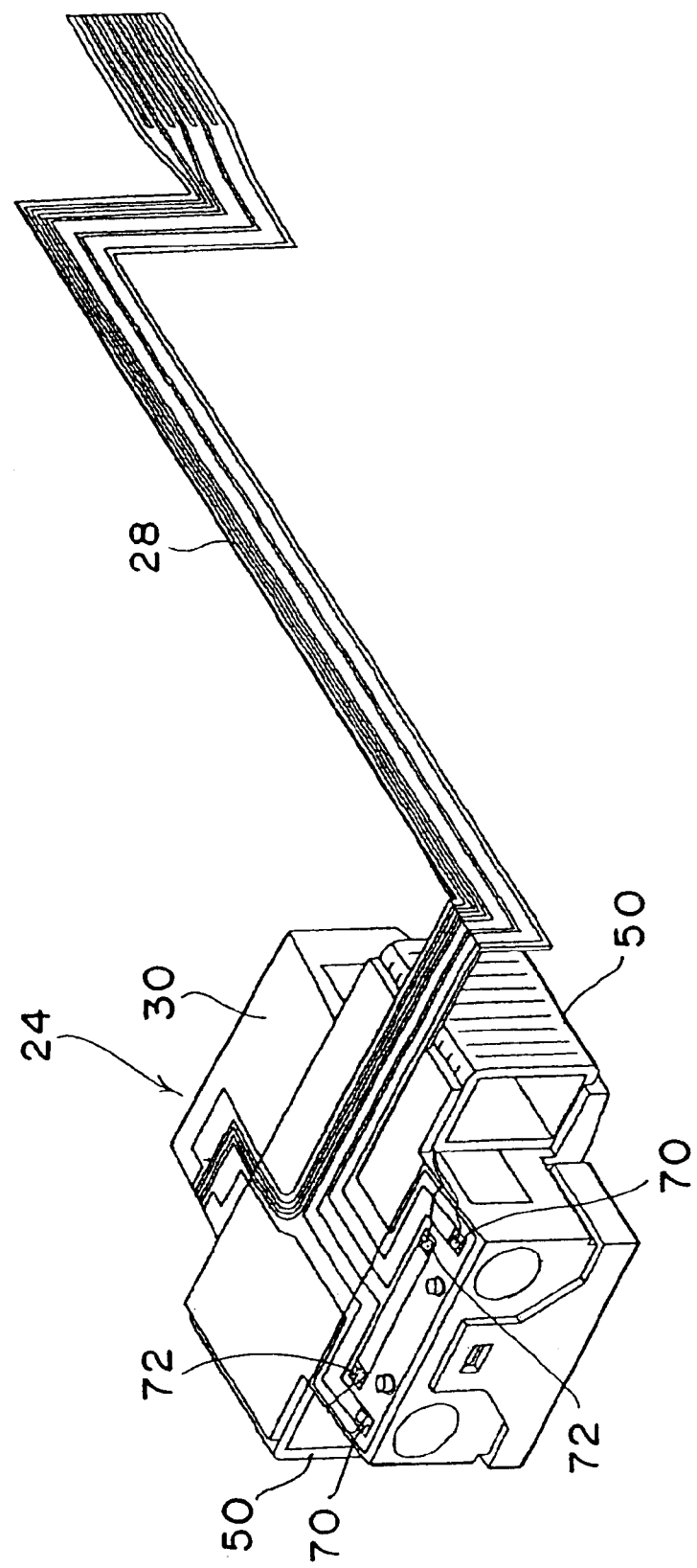
FIG. 7 is a perspective view of the carriage assembly as viewed from its lower side.

Referring to FIG. 6, the carriage assembly 24 including the FPC sheet 28 is shown in exploded perspective from its lower side. An L-shaped metal fitting 68 is fixed to the lower surface of the carriage 30. The FPC sheet 28 has a first end 28a and a second end 28b. The first end 28a is formed with two pairs of lands 70 and 72 of printed circuit patterns. The second end 28b is connected to a connector provided on the side of a drive circuit (not shown). The FPC sheet 28 is branched to form an FPC sheet 28c. Referring to FIG. 7, the carriage assembly 24 is shown in perspective from its lower side. The FPC sheet 28 is bonded to the lower surface of the carriage 30 and the L-shaped metal fitting 68 (concealed by the FPC sheet 28 in FIG. 7). Leads from the opposite ends of the carriage driving coil 50 on one side of the carriage 30 are soldered to the lands 70 and 72 on the same side, and leads from the opposite ends of the carriage driving coil 50 on the other side of the carriage 30 are soldered to the lands 70 and 72 on the same side.

Figure 8:
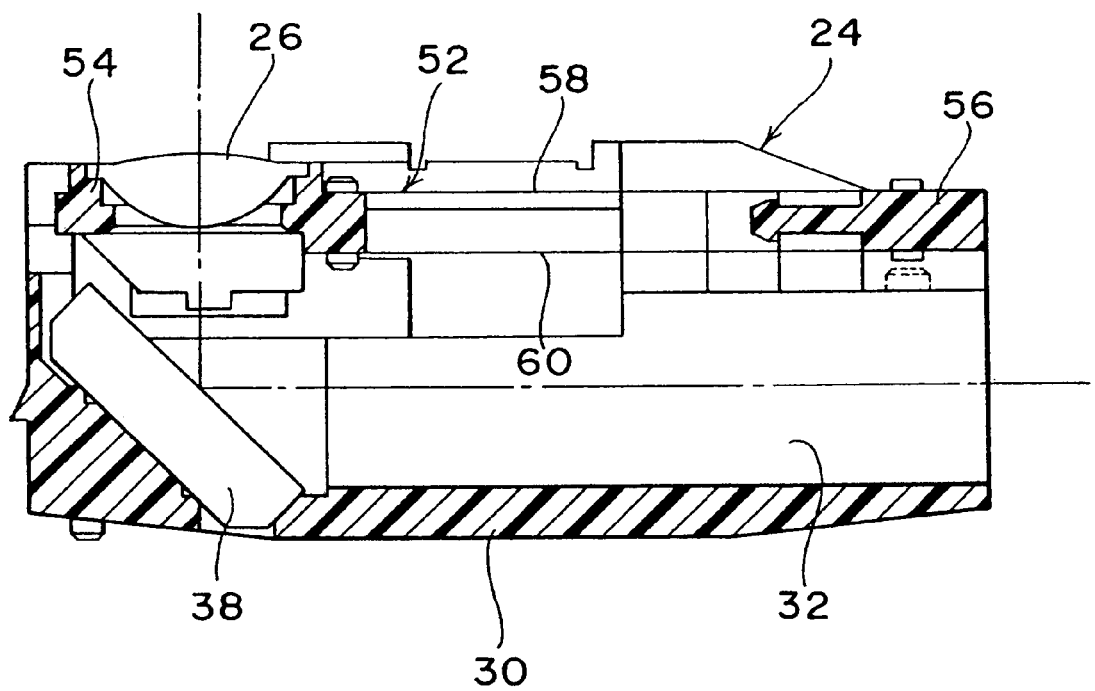
FIG. 8 is a longitudinal sectional view of the carriage assembly.

Referring to FIG. 8, there is shown a longitudinal sectional view of the carriage assembly 24. As apparent from FIG. 8, the objective lens actuator 52 is mounted on the carriage 30, and the beam raising mirror 38 is mounted at an end portion of the groove (passage) 32 of the carriage 30. The laser beam output from the laser diode 8 of the fixed optical assembly 6 shown in FIG. 1 is reflected at right angles by the beam raising mirror 38 to enter the objective lens 26, and is then focused on a recording surface of the optical disk by the objective lens 26.

Figure 9:
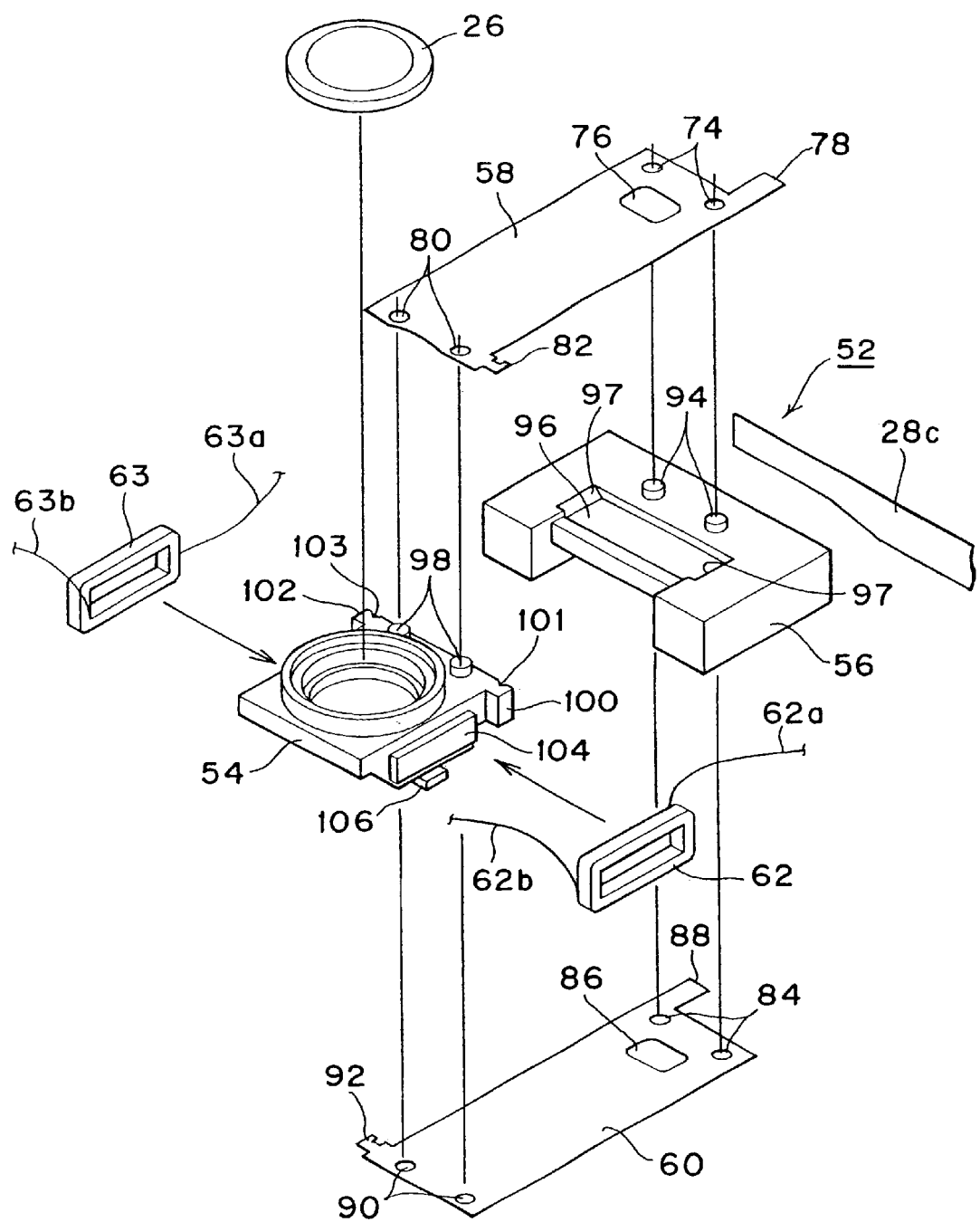
FIG. 9 is an exploded perspective view of an objective lens driving mechanism as viewed from its upper side.

The detailed structure of the objective lens actuator 52 will now be described with reference to FIGS. 9 to 13. Referring to FIG. 9 which is an exploded perspective view of the objective lens actuator 52, the upper leaf spring 58 has a pair of round holes 74 and a rectangular hole 76 at one end portion. The leaf spring 58 is further formed at its one end with a first projecting portion 78 extending in the longitudinal direction of the leaf spring 58. Further, the leaf spring 58 is formed at its other end with a pair of round holes 80 and a second projecting portion 82 extending in the transverse direction of the leaf spring 58 which direction is orthogonal to the longitudinal direction of the leaf spring 58.

On the other hand, the lower leaf spring 60 is formed at its one end with a pair of round holes 84, a rectangular hole 86, and a third projecting portion 88 extending in the longitudinal direction of the leaf spring 60. Further, the leaf spring 60 is formed at its other end with a pair of round holes 90 and a fourth projecting portion 92 extending in the transverse direction of the leaf spring 60 which direction is orthogonal to the longitudinal direction of the leaf spring 60. Each of the leaf springs 58 and 60 is a thin sheet formed of a conductive material such as phosphor bronze or beryllium copper, and having a thickness of about 20 to 30 μm. The leaf springs 58 and 60 have the same shape, and they are used in reversed relationship with each other for the convenience of handling.

The upper and lower leaf springs 58 and 60 are vertically aligned so that the first and third projecting portions 78 and 88 are positioned in symmetry with respect to the longitudinally extending center line of the leaf spring 58 or 60 as viewed in plan and that the second and fourth projecting portions 82 and 92 extend in opposite directions. The fixing member 56 is formed of molded resin. The fixing member 56 has an upper surface formed with a pair of pins 94 and a recess 96. The recess 96 has opposite ends formed with a pair of slant surfaces 97.

Figure 11:
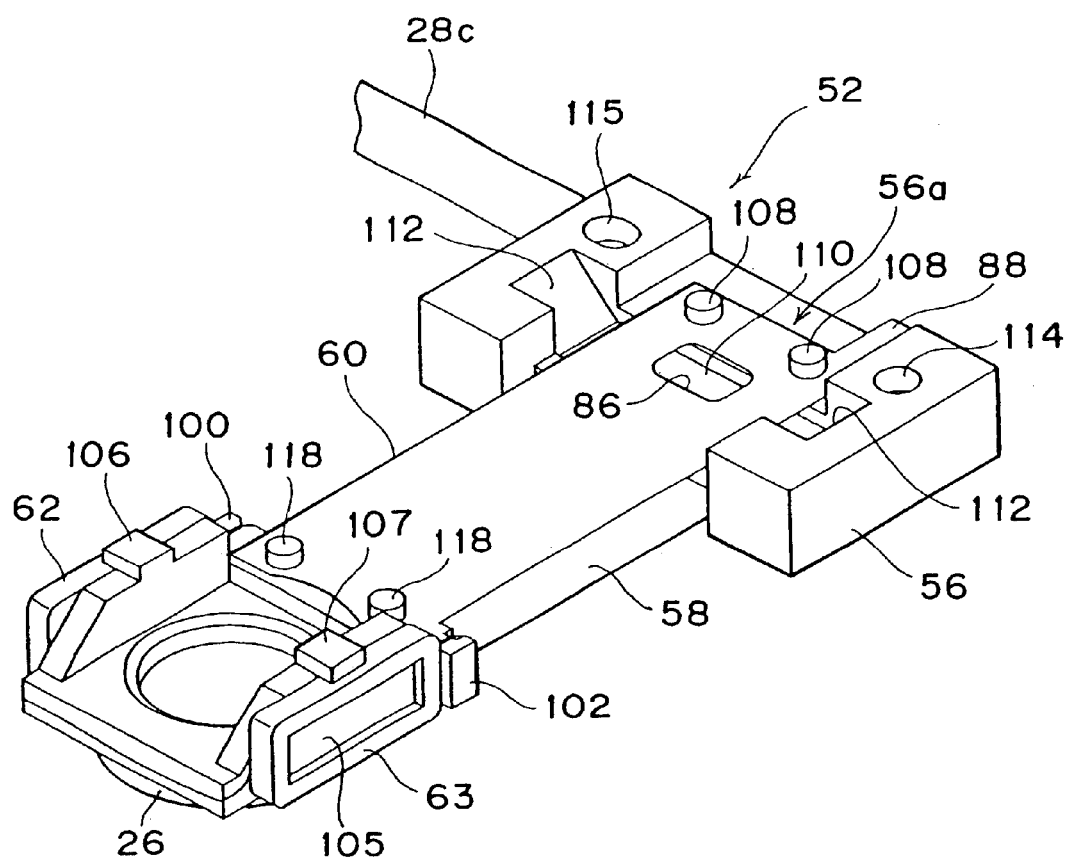
FIG. 11 is a perspective view of the objective lens driving mechanism as viewed from its lower side.

As shown in FIG. 11 which is a perspective view of the objective lens actuator 52 as viewed from its lower side, the fixing member 56 has a lower surface formed with a recess 56a, a pair of pins 108, and a recess 110. The recess 110 has opposite ends formed with a pair of slant surfaces 112. The recess 56a is formed to define a light passage for the laser beam from the laser diode 8, so that the vertical size of the carriage assembly 24 can be reduced to thereby contribute to a reduction in weight of the carriage assembly 24.

Figure 10:
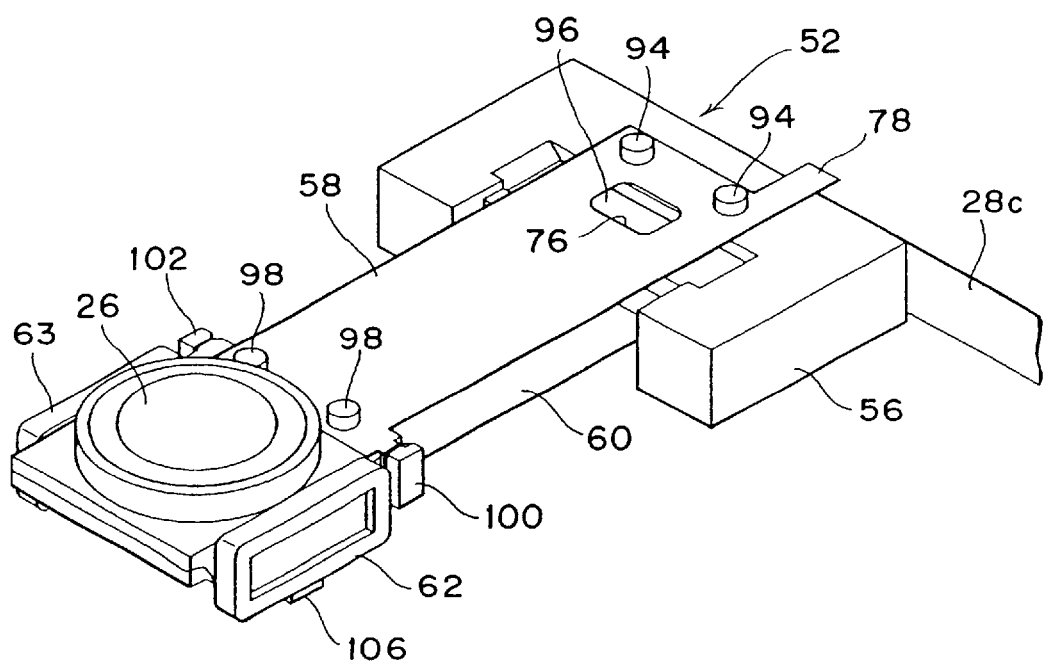
FIG. 10 is a perspective view of the objective lens driving mechanism as viewed from its upper side.

The lens holder 54 has an upper surface formed with a pair of pins 98 as shown in FIGS. 9 and 10 and a lower surface formed with a pair of pins 118 as shown in FIG. 11. Further, the lens holder 54 has first and second projecting portions 100 and 102 at positions respectively corresponding to the second and fourth projecting portions 82 and 92 of the leaf springs 58 and 60. The first projecting portion 100 is formed with a V groove 101, and the second projecting portion 102 is formed with a V groove 103.

As shown in FIGS. 9 and 11, the lens holder 54 has opposite side surfaces formed with raised portions 104 and 105 for respectively mounting the focusing coils 62 and 63 and stoppers 106 and 107 for respectively vertically positioning the focusing coils 62 and 63. The focusing coil 62 is engaged with the raised portion 104 and bonded thereto, and the focusing coil 63 is engaged with the raised portion 105 and bonded thereto. The focusing coil 62 has leads 62a and 62b at its opposite ends, and the focusing coil 63 has leads 63a and 63b at its opposite ends.

The objective lens actuator 52 is assembled in the following manner. First, the focusing coils 62 and 63 are put to engagement with the raised portions 104 and 105 of the lens holder 54, respectively, and fixed thereto by an adhesive. Then, the lens holder 54 and the fixing member 56 are set on a jig so that the relative positional relation between the two members 54 and 56 is maintained. In this condition, the round holes 80 of the leaf spring 58 are put to engagement with the pins 98 of the lens holder 54, and fixed thereto by an adhesive. Further, the round holes 74 of the leaf spring 58 are put to engagement with the pins 94 of the fixing member 56, and fixed thereto by an adhesive.

Similarly, the round holes 90 of the leaf spring 60 are put to engagement with the pins 118 of the lens holder 54, and fixed thereto by an adhesive. Further, the round holes 84 of the leaf spring 60 are put to engagement with the pins 108 of the fixing member 56, and fixed thereto by an adhesive. Thus, the leaf springs 58 and 60 can be easily positioned to the lens holder 54 and the fixing member 56 although these members 58 and 60 are small parts. The lead 62a extending from one end of the focusing coil 62 is wound around the second projecting portion 82 of the leaf spring 58 and the first projecting portion 100 of the lens holder 54 as being guided by the V groove 101, and thereafter soldered to the leaf spring 58.

Similarly, the lead 63a extending from one end of the focusing coil 63 is wound around the fourth projecting portion 92 of the leaf spring 60 and the second projecting portion 102 of the lens holder 54 as being guided by the V groove 103, and thereafter soldered to the leaf spring 60. The shape of the V grooves 101 and 103 is merely illustrative, and any other shapes having a guide structure capable of easily guiding the leads 62a and 63a and hardly breaking these. Thereafter, the lead 62b extending from the other end of the focusing coil 62 and the lead 63b extending from the other end of the focusing coil 63 are connected together. Thus, the leaf springs 58 and 60 and the focusing coils 62 and 63 are electrically connected in series.

Although the focusing coils 62 and 63 are separate members as shown in FIG. 9, these two coils may be integrated by eliminating the connection of the leads 62b and 63b. Alternatively, the projecting portions 82 and 92 as terminal portions may be formed on both sides of each of the leaf springs 58 and 60, and the leads 62a and 62b of the focusing coil 62 may be connected to the projecting portions 82 of the leaf springs 58 and 60 on the same side, while the leads 63a and 63b of the focusing coil 63 being connected to the projecting portions 92 of the leaf springs 58 and 60 on the same side. In other words, the focusing coils 62 and 63 may be connected in parallel to the leaf springs 58 and 60.

A damper material is injected from the rectangular hole 76 of the leaf spring 58 into the recess 96 of the fixing member 56. Similarly, the damper material is injected also from the rectangular hole 86 of the leaf spring 60 into the recess 110 of the fixing member 56. While the damper material may be of a UV curing type or a heat curing type, the UV curing type damper material is preferable because it is convenient in working with shorter working time. However, unless sufficiently exposed to UV radiation, the UV curing type damper material does not gel to a proper hardness.

In this respect, the slant surfaces 97 are formed at the opposite ends of the recess 96 of the fixing member 56, and the slant surfaces 112 are formed at the opposite ends of the recess 110 of the fixing member 56. Accordingly, the UV curing type damper material injected into the recesses 96 and 110 is irradiated with UV radiation not only through the rectangular holes 76 and 86, but also along the slant surfaces 97 and 112, thereby allowing sufficient gelling of the damper material. Thus, the damper material is interposed between the upper leaf spring 58 and the fixing member 56 and between the lower leaf spring 60 and the fixing member 56 to thereby damp undesirable resonance of the leaf springs 58 and 60.

Figure 12:
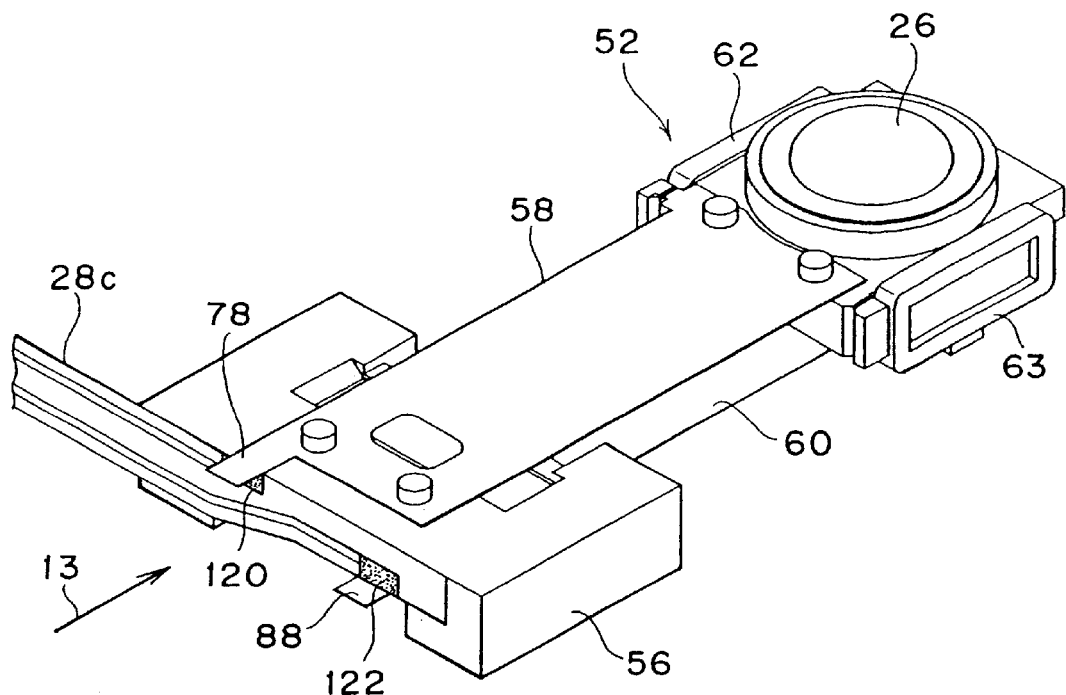
FIG. 12 is a perspective view of the objective lens driving mechanism as viewed from its rear side.
Figure 13:
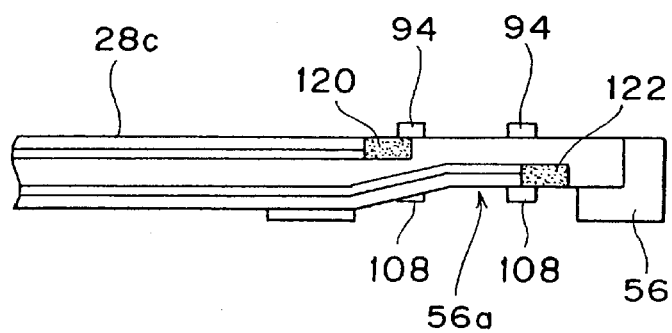
FIG. 13 is a view taken in the direction of an arrow 13 in FIG. 12.

Thereafter, the objective lens 26 is mounted on the lens holder 54, and fixed thereto by an adhesive. However, prior to bonding the objective lens 26 to the lens holder 54, the fixing member 56 may be mounted on the carriage 30 by engaging a round hole 114 and an elongated hole 115 formed on the lower surface of the fixing member 56 (see FIG. 11) with a pair of positioning pins 116 formed on the upper surface of the carriage 30 (see FIG. 3). Finally, as shown in FIGS. 12 and 13, the FPC sheet 28c branched from the FPC sheet 28 is bonded to the rear surface of the fixing member 56 in the condition that lands 120 and 122 on the FPC sheet 28c are aligned with the first and third projecting portions 78 and 88 of the leaf springs 58 and 60, respectively. Thereafter, the first projecting portion 78 and the land 120 are soldered together, and the third projecting portion 88 and the land 122 are soldered together. Thus, the current feed to the focusing coils 62 and 63 is effected from the FPC sheets 28 and 28c through the conductive leaf springs 58 and 60. Further, the current feed to the carriage driving coils 50 is effected directly from the FPC sheet 28.

More specifically, as shown in FIG. 12, the lands 120 and 122 are formed at upper and lower portions on an end portion of the FPC sheet 28c so as to be spaced a longitudinal distance equal to that between the first and third projecting portions 78 and 88 as terminal portions of the leaf springs 58 and 60. Further, the first projecting portion 78 of the leaf spring 58 projects from the rear end surface of the fixing member 56 and faces the land 120 in substantially perpendicular relationship. Similarly, the third projecting portion 88 of the leaf spring 60 projects from the rear end surface of the fixing member 56 and faces the land 122 in substantially perpendicular relationship.

Accordingly, the first projecting portion 78 and the land 120 substantially perpendicular to each other can be easily connected together by soldering or ball bonding, for example. Similarly, the third projecting portion 88 and the land 122 substantially perpendicular to each other can be easily connected together by soldering or ball bonding, for example. Alternatively, end portions of the first and third projecting portions 78 and 88 may be bent at right angles and bonded to the lands 120 and 122, respectively, by using a conductive adhesive. As shown in FIG. 13, the width of a connecting end portion of the FPC sheet 28c on which the lands 120 and 122 are formed is preferably set substantially equal to or smaller than the width of the rear end surface of the fixing member 56. However, the connecting end portion of the FPC sheet 28c may be slightly inclined with respect to the mounting surface (rear end surface) of the fixing member 56 as by insertion between the first and third projecting portions 78 and 88, because these portions 78 and 88 are symmetrical in position with respect to the longitudinally extending center line of the leaf spring 58 or 60 as viewed in plan. In this case, the width of the connecting end portion of the FPC sheet 28c may be larger than the width of the mounting surface of the fixing member 56. That is, the connecting end portion of the FPC sheet 28c may be slightly projected from the upper surface of the fixing member 56.

With this arrangement, the lands 120 and 122 of the FPC sheet 28c can be easily connected to the first and third projecting portions 78 and 80 of the leaf springs 58 and 60, respectively. Furthermore, the FPC sheet 28c has no influence on the elasticity of the leaf springs 58 and 60, so that the elastic forces of the leaf springs 58 and 60 can be easily controlled. The focusing magnetic circuits 40 mounted on the carriage 30 and the focusing coils 62 and 63 fixed to the lens holder 54 form an electromagnetic drive system, in which the objective lens 26 can be moved along its optical axis (in the focusing direction) by supplying a current through the leaf springs 58 and 60 to the focusing coils 62 and 63.

The focusing mechanism configured by the focusing magnetic circuits 40 and the focusing coils 62 and 63 performs focusing control of the objective lens 26 so that the focal point of the objective lens 26 always lies on the fluctuating recording surface of the optical disk. On the other hand, each carriage driving coil 50 is inserted in a gap defined between the yoke 20 and the permanent magnet 22 of the corresponding magnetic circuit 16. Each coil 50 and the corresponding magnetic circuit 16 constitute a voice coil motor (VCM), in which the carriage assembly 24 can be moved in the radial direction of the optical disk as being guided by the guide rails 14 by supplying a current through the FPC sheet 28 to the coils 50.

The carriage driving mechanism configured by the magnetic circuits 16 and the coils 50 moves the carriage assembly 24 in the radial direction of the optical disk to thereby move the objective lens 26 to an arbitrary track on the optical disk (seek control). Further, the carriage driving mechanism performs tracking control such that the focal point of the objective lens 26 always follows a desired track whose position is fluctuated in the radial direction of the optical disk by the vibrations of the spindle motor 4 or by off-centering upon chucking the optical disk. The carriage driving mechanism is not limited to a voice coil motor (VCM). For example, a pulse motor may be used as in a medium drive for handling a medium such as a compact disk (CD) and a digital video disk (DVD).

According to the present invention as described above, the current feed to the focusing coils is performed through the conductive leaf springs, thereby improving the assembly workability of the objective lens driving mechanism and also contributing to the stabilization of mechanical characteristics of the objective lens driving mechanism. Furthermore, high-precision positioning of the focal point of the objective lens can be achieved by the stabilization of mechanical characteristics of the objective lens driving mechanism, so that it is possible to provide an optical storage device which can realize high-density recording and/or reproduction of information. Moreover, the objective lens actuator to be driven in the focusing direction only and the carriage assembly can be reduced in size and weight, so that it is possible to provide an objective storage device which can effect high-speed access.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical driving device comprising:
    an objective lens for focusing a light beam onto an object;
    a lens holder having said objective lens;
    a platelike conductive elastic support member having one end for supporting said lens holder and the other end having a first terminal portion;
    a fixing member for fixing said other end of said platelike conductive elastic support member, said first terminal portion extendable past said fixing member in a direction opposite to said one end;
    a coil electrically connected to said platelike conductive elastic support member and fixed to said lens holder; and
    a flexible printed circuit board connected to said first terminal portion of said platelike conductive elastic support member,
    wherein said first terminal portion of said platelike conductive elastic support member is provided at a position facing a land of said flexible printed circuit board at right angles to said land.

2. An optical driving device according to claim 1, wherein said platelike conductive elastic support member further has a second terminal portion connected to said coil.

3. An optical driving device according to claim 2, wherein said lens holder has a guide for guiding a lead from said coil toward said second terminal portion of said platelike conductive elastic support member.

4. An optical driving device according to claim 2, wherein said second terminal portion extends in a transverse direction of said platelike conductive elastic support member.

5. An optical driving device according to claim 1, wherein said first terminal portion extends in a longitudinal direction of said platelike conductive elastic support member.

6. The optical driving device according to claim 1, wherein a planar width of said first terminal portion is smaller than a planar width of said platelike conductive elastic support member.

7. The optical driving device according to claim 1, wherein said first terminal portion can bend at a right angle to a plane of said platelike conductive elastic support member.

8. An optical driving device, comprising:
    an objective lens for focusing a light beam onto an object;
    a lens holder having said objective lens;
    a platelike conductive elastic support member having one end for supporting said lens holder and the other end having a first terminal portion;
    a fixing member for fixing said other end of said platelike conductive elastic support member, said first terminal portion extendable past said fixing member in a direction opposite to said one end;
    a coil electrically connected to said platelike conductive elastic support member and fixed to said lens holder; and
    a flexible printed circuit board connected to said first terminal portion of said platelike conductive elastic support member,
    wherein said first terminal portion of said platelike conductive elastic support member is provided at a position facing a land of said flexible printed circuit board at right angles to said land,
    wherein said platelike conductive elastic support member further has a second terminal portion connected to said coil,
    wherein said first terminal portion extends in a longitudinal direction of said platelike conductive elastic support member, and
    wherein said platelike conductive elastic support member comprises a pair of first and second conductive leaf springs provided above and below said lens holder, each of said first and second conductive leaf springs having one end for supporting said lens holder and the other end having a first terminal portion, said first terminal portions of said first and second conductive leaf springs being positioned in symmetry with respect to a longitudinally extending center line of said first or second conductive leaf spring.

9. An optical driving device according to claim 8, wherein each of said first and second conductive leaf springs further has a second terminal portion connected to said coil, said second terminal portions of said first and second conductive leaf springs being positioned in symmetry with respect to said longitudinally extending center line.

10. An optical storage device capable of at least reading information recorded on an optical storage medium, comprising:
    a carriage adapted to be reciprocated in a given direction of said optical storage medium;
    a driving unit reciprocating said carriage in said given direction;
    an objective lens for focusing a light beam output from a light source onto said optical storage medium;
    a lens holder having said objective lens;
    a platelike conductive elastic support member having one end for supporting said lens holder and the other end having a first terminal portion;
    a fixing member mounted on said carriage for fixing said other end of said platelike conductive elastic support member, said first terminal portion extendable past said fixing member in a direction opposite to said one end;
    a coil electrically connected to said platelike conductive elastic support member and fixed to said lens holder; and a flexible printed circuit board connected to said first terminal portion of said platelike conductive elastic support member, wherein said first terminal portion of said platelike conductive elastic support member is provided at a position facing a land of said flexible printed circuit board at right angles to said land.

11. An optical storage device according to claim 10, wherein said platelike conductive elastic support member further has a second terminal portion connected to said coil.

12. An optical storage device according to claim 11, wherein said lens holder has a guide for guiding a lead from said coil toward said second terminal portion of said platelike conductive elastic support member.

13. An optical storage device according to claim 11, wherein said second terminal portion extends in a transverse direction of said platelike conductive elastic support member.

14. An optical storage device according to claim 10, wherein said first terminal portion extends in a longitudinal direction of said platelike conductive elastic support member.

15. The optical storage device according to claim 10, wherein a planar width of said first terminal portion is smaller than a planar width of said platelike conductive elastic support member.

16. The optical storage device according to claim 10, wherein said first terminal portion can bend at a right angle to a plane of said platelike conductive elastic support member.

17. An optical storage device capable of at least reading information recorded on an optical storage medium, comprising:

a carriage adapted to be reciprocated in a given direction of said optical storage medium;

a driving unit reciprocating said carriage in said given direction;

an objective lens for focusing a light beam output from a light source onto said optical storage medium;

a lens holder having said objective lens;

a platelike conductive elastic support member having one end for supporting said lens holder and the other end having a first terminal portion;

a fixing member mounted on said carriage for fixing said other end of said platelike conductive elastic support member, said first terminal portion extendable past said fixing member in a direction opposite to said one end;

a coil electrically connected to said platelike conductive elastic support member and fixed to said lens holder; and a flexible printed circuit board connected to said first terminal portion of said platelike conductive elastic support member, wherein said first terminal portion of said platelike conductive elastic support member is provided at a position facing a land of said flexible printed circuit board at right angles to said land, wherein said platelike conductive elastic support member further has a second terminal portion connected to said coil, wherein said first terminal portion extends in a longitudinal direction of said platelike conductive elastic support member, and wherein said platelike conductive elastic support member comprises a pair of first and second conductive leaf springs provided above and below said lens holder, each of said first and second conductive leaf springs having one end for supporting said lens holder and the other end having a first terminal portion, said first terminal portions of said first and second conductive leaf springs being positioned in symmetry with respect to a longitudinally extending center line of said first or second conductive leaf spring.

18. An optical storage device according to claim 17, wherein each of said first and second conductive leaf springs further has a second terminal portion connected to said coil, said second terminal portions of said first and second conductive leaf springs being positioned in symmetry with respect to said longitudinally extending center line.

* * * * *